(12) United States Patent
Bouton et al.

(10) Patent No.: US 10,618,558 B2
(45) Date of Patent: Apr. 14, 2020

(54) MOTOR VEHICLE STRUCTURAL COMPONENT AND FRONT LOWER SECTION COMPRISING SUCH A COMPONENT

(71) Applicant: ArcelorMittal, Luxembourg (LU)

(72) Inventors: Cédric Bouton, La Garenne Colombes (FR); Edith Lahellec, Sarry (FR); Jean-Louis Colmont, Cergy Saint Christophe (FR); Thierry Derchu, Bar le Duc (FR); Maxime Gabrel, Mairy sur Marne (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 15/767,953

(22) PCT Filed: Oct. 11, 2016

(86) PCT No.: PCT/IB2016/056066
§ 371 (c)(1),
(2) Date: Apr. 12, 2018

(87) PCT Pub. No.: WO2017/064611
PCT Pub. Date: Apr. 20, 2017

(65) Prior Publication Data
US 2018/0304928 A1 Oct. 25, 2018

(30) Foreign Application Priority Data
Oct. 14, 2015 (WO) .................. PCT/IB2015/057873

(51) Int. Cl.
*B62D 21/15* (2006.01)
*B62D 25/08* (2006.01)

(52) U.S. Cl.
CPC .......... *B62D 21/152* (2013.01); *B62D 25/08* (2013.01); *B62D 25/082* (2013.01)

(58) Field of Classification Search
CPC ...... B62D 21/15; B62D 21/152; B62D 25/00; B62D 25/04; B62D 25/082; B62D 21/157;
(Continued)

(56) References Cited

U.S. PATENT DOCUMENTS 4,410,208 A * 10/1983 Mulso, Jr. ............... B60R 19/34
180/271
6,695,393 B1 * 2/2004 Aouadi ................ B62D 21/152
296/187.09
(Continued)

FOREIGN PATENT DOCUMENTS

| FR | 2874368 A1 | 2/2006 |
| FR | 2926052 A1 | 7/2009 |
| WO | 2005003587 A1 | 1/2005 |

*Primary Examiner* — D Glenn Dayoan
*Assistant Examiner* — Sunsurraye Westbrook
(74) *Attorney, Agent, or Firm* — Davidson, Davidson & Kappel, LLC (57) ABSTRACT

A structural component connected to a structural element is provided. The structural component includes an extension extending in a longitudinal direction between a front end and a rear end, the rear end facing the structural element. The structural component also includes a stop element protruding from a longitudinal wall of the extension. The stop element has a contact surface facing a region of the structural element. When the extension is subject to an impact creating forces in the longitudinal direction, the contact surface comes into contact with the region and transmits a part of the forces created by the impact to the region.

18 Claims, 4 Drawing Sheets

(58) Field of Classification Search
CPC .. B62D 29/001; B62D 29/005; B62D 25/025; B62D 25/08; B62D 29/007; B62D 29/04
USPC .... 296/193.03, 193.09, 187.03, 209, 203.01, 296/205; 29/897.2, 428, 527.2; 293/132, 293/120, 102, 122, 133
See application file for complete search history.

(56) References Cited

U.S. PATENT DOCUMENTS

| | | |
|---|---|---|
| 8,056,685 B2 | 11/2011 | Canot et al. |
| 9,056,634 B2 * | 6/2015 | Watanabe ............ B62D 21/152 |
| 9,387,883 B2 * | 7/2016 | Hirota ................. B62D 25/082 |
| 2004/0200659 A1 | 10/2004 | Miyasaka |
| 2006/0249342 A1 | 11/2006 | Canot et al. |
| 2010/0201159 A1 | 8/2010 | Chretien et al. |
| 2014/0203543 A1 | 7/2014 | Onishi et al. |

* cited by examiner

MOTOR VEHICLE STRUCTURAL COMPONENT AND FRONT LOWER SECTION COMPRISING SUCH A COMPONENT

The present invention relates to a motor vehicle structural component, intended to be connected to a structural element of said motor vehicle of the cradle type, said component comprising an extension extending in a longitudinal direction between a front end and a rear end, said rear end being configured to face said structural element when said component is connected to said structural element.

The invention in particular relates to a component of a front low area section of a motor vehicle.

BACKGROUND

The front part of a vehicle plays an essential role in case of impact, in particular during a frontal impact. In particular, the front part of a vehicle must be capable of participating in shock absorption, i.e., in contributing to the absorption and dissipation of the forces created by the impact.

The behavior of the front part of the vehicle during impacts is subject to constraints, some of which are described in a standardized way. These in particular involve standards governing the behavior of the front part during a low-speed impact, also called repairability impact, and during a high-speed impact.

In order to improve the behavior of the front part, in particular in case of high-speed impact, it is advantageous to configure this front part so as to distribute the forces created during an impact on several load paths, in particular to distribute these forces between the upper area, the middle area and the low area of the front part of the vehicle.

The middle area generally comprises two stringers extending in a longitudinal direction of the vehicle, the two stringers of the middle area further being connected by a transverse beam.

The low area generally includes a cradle, or front cradle, intended to support the front suspension of the vehicle. The low area also includes two extensions positioned on each side of the vehicle, each extension including a first elongate part extending from the front cradle toward the rear of the vehicle, in a substantially longitudinal direction. Such a low area structure is in particular described in document FR 2,887,211 A1.

The extension is connected directly or indirectly to the front cradle, and is configured to absorb forces generated by an impact, in particular frontal, and to cause at least some of these forces to pass toward the front cradle.

During a high-speed frontal impact, the vehicle experiences an impact against an obstacle at a speed exceeding 50 km/h.

During a low-speed frontal impact, the vehicle experiences an impact against an obstacle at a speed of about 16 km/h. When such impacts occur, the chassis of the vehicle, in particular its stringers, the front cradle and the extensions of the low area, must not be plastically deformed.

The requirements in terms of weight and behavior during high-speed frontal impact have recently led to causing increasingly significant forces to pass through the front low area of the vehicle.

However, the absorption of increasingly significant forces by the front low area during high-speed frontal impacts has led to subjecting the front low area to increased forces during low-speed frontal impacts, and thus altering the behavior of the low area during such low-speed impacts, in particular plastically deforming the cradle under the effect of the forces transmitted by the extensions.

SUMMARY OF THE INVENTION

In order to improve the behavior of the front low area, in particular the cradle, during low-speed impact, one solution consists of reinforcing the front cradle, for example by increasing the thickness of the cradle or adding reinforcements thereto. Such a solution is not fully satisfactory.

One aim of the invention is therefore a front low area, in particular an extension, making it possible to avoid a deformation of the cradle during a low-speed impact.

To that end, the invention provides a motor vehicle structural component configured to be connected to a structural element of a motor vehicle of the cradle type, the component comprising:

an extension extending in a longitudinal direction between a front end and a rear end, the rear end being configured to face a structural element when the component is connected to the structural element; and a stop element protruding in a transverse direction from a longitudinal wall of said extension, said stop element comprising a first contact surface configured to face a first region of said structural element when said component is connected to said structural element, said stop element further being configured such that when said extension is subject to an impact creating forces in said longitudinal direction from said front end toward said rear end, said first contact surface of said stop element comes into contact with said first region of said structural element and transmits a first part of the forces created by said impact to said first region of said structural element.

According to particular embodiments, the component may include one or more of the following features, considered alone or according to any technically possible combination:

said stop element is configured such that said first part of the forces transmitted by said first contact surface of said stop element to said first region of said structural element remains below a first predetermined force threshold, independently of the forces created by said impact;

said first predetermined force threshold is greater than or equal to a second force threshold corresponding to the forces transmitted by said first contact surface to said first region of said structural element during an impact at a first predetermined speed, in particular a low-speed impact;

said first predetermined force threshold is less than a third force threshold corresponding to the forces that would be transmitted by said first contact surface to said first region of said structural element during an impact at a second predetermined speed, in particular a high-speed impact;

said stop element is fastened to said longitudinal wall of said extension by frangible fastening means;

said frangible fastening means are configured to break when said first part of the forces becomes equal to said first predetermined force threshold;

the component comprises a bending initiation zone, said component being configured to bend at said bending initiation zone when said first part of the forces becomes equal to said first predetermined force threshold, such that said first part of the forces transmitted by said first contact surface of said stop element to said first region of said structural element remains below said first predetermined force threshold;

said rear end comprises at least one second contact surface intended to face at least one second region of said structural element when said component is connected to said structural element, said component being configured such that when said extension is subject to an impact creating forces in said longitudinal direction from said front end toward said rear end, said second contact surface comes into contact with said second region of said structural element and transmits a second part of the forces created by said impact to said second region of said structural element;

the first and second contact surfaces extend in a first and second plane, respectively, said first and second planes being separate;

said rear end comprises the one second contact surface and a third contact surface, said third contact surface extending in a third plane separate from the first and second planes, said extension being configured such that when said extension is subject to an impact creating forces in said longitudinal direction from said front end toward said rear end, said second contact surface comes into contact with said second region of said structural element and transmits a second part of the forces created by said impact to said second region of said structural element, and said third contact surface comes into contact with a third region of said structural element and transmits a third part of the forces created by said impact to said third region of said structural element;

said extension comprises an elongate part extending in said longitudinal direction and an intermediate part secured to one end of said elongate part, said intermediate part comprising said second contact surface;

said intermediate part further comprises said third contact surface;

said stop element is made from a steel having a tensile strength greater than or equal to 570 MPa.

The invention also provides a front low area section of a motor vehicle, comprising a component according to the invention and a structural element of the cradle type comprising a first region, said component being connected to said structural element, said stop element facing a first region of said structural element, said stop element being configured such that when said extension is subject to an impact creating forces in said longitudinal direction from said front end toward said rear end, said first contact surface of said stop element comes into contact with said first region of said structural element and transmits a first part of the forces created by said impact to said first region of said structural element.

According to particular embodiments, the front low area section may include one or more of the following features, considered alone or according to any technically possible combination:

said rear end comprises at least one second contact surface facing at least one second region of said structural element, said component being configured such that when said extension is subject to an impact creating forces in said longitudinal direction from said front end toward said rear end, said second contact surface comes into contact with said second region of said structural element and transmits a second part of the forces created by said impact to said second region of said structural element;

a first distance between said first contact surface and said first region is substantially equal to a second distance between said second contact surface and said second region, the difference between said first distance and said second distance being, in absolute value, less than or equal to 1.0 mm;

the first and second contact surfaces extend in a first and second plane, respectively, said first and second planes being separate, said rear end comprises the one second contact surface and a third contact surface, said third contact surface extending in a third plane separate from the first and second planes, said extension being configured such that when said extension is subject to an impact creating forces in said longitudinal direction from said front end toward said rear end, said second contact surface comes into contact with said second region of said structural element and transmits a second part of the forces created by said impact to said second region of said structural element, and said third contact surface comes into contact with a third region of said structural element and transmits a third part of the forces created by said impact to said third region of said structural element;

the second distance between said second contact surface and said second region is substantially equal to a third distance between said third contact surface and said third region, the difference between said second distance and said third distance being, in absolute value, less than or equal to 1.0 mm;

said stop element is configured such that said first part of the forces transmitted by said first contact surface of said stop element to said first region of said structural element remains below a first predetermined force threshold, independently of the forces created by said impact;

said first predetermined force threshold is greater than or equal to a second force threshold corresponding to the forces transmitted by said first contact surface to said first region of said structural element during an impact at a first predetermined speed, in particular a low-speed impact;

said first predetermined force threshold is less than a third force threshold corresponding to the forces that would be transmitted by said first contact surface to said first region of said structural element during an impact at a second predetermined speed, in particular a high-speed impact;

said stop element is fastened to said longitudinal wall of said extension by frangible fastening means;

said frangible fastening means are configured to break when said first part of the forces becomes equal to said first predetermined force threshold;

the component comprises a bending initiation zone, said component being configured to bend at said bending initiation zone when said first part of the forces becomes equal to said first predetermined force threshold, such that said first part of the forces transmitted by said first contact surface of said stop element to said first region of said structural element remains below said first predetermined force threshold;

said extension comprises an elongate part extending in said longitudinal direction and an intermediate part secured to one end of said elongate part, said intermediate part comprising said second contact surface;

said intermediate part further comprises said third contact surface;

said stop element is made from a steel having a tensile strength greater than or equal to 570 MPa.

The invention further provides a motor vehicle structure, comprising a front low area section according to the invention.

BRIEF DESCRIPTION OF THE FIGURES

Other features and advantages of the invention will appear upon reading the following description, as well as the appended drawings, in which.

DETAILED DESCRIPTION

In the rest of this document, the chosen orientations are provided for information only and are to be understood relative to a motor vehicle. In particular, the terms "top", "bottom", "front" and "rear" are used in reference to the typical orientation of the elements, components or parts when they are assembled on a motor vehicle structure.

Furthermore, the terms "transverse" and "longitudinal" must be understood in relation to the longitudinal axis of the motor vehicle, which is the axis of elongation and movement of the motor vehicle.

Figure 1:
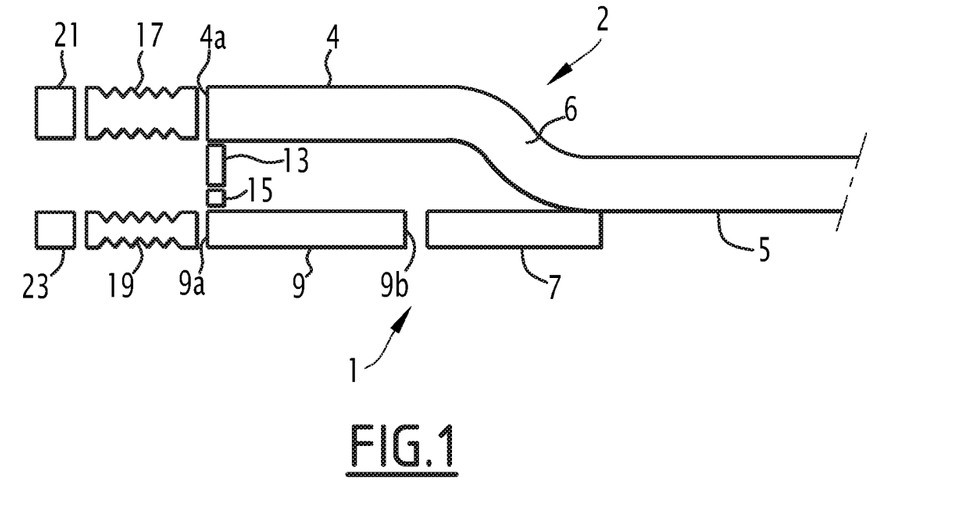
FIG. 1 schematically shows the front of a motor vehicle from the side, comprising a front low area section according to one embodiment of the invention.

FIG. 1 shows the front part 1 of a vehicle according to a first embodiment of the invention.

The front part comprises an elongated structural element 2, hereinafter called stringer or front stringer. The stringer 2 comprises a front portion 4 extending in a first substantially longitudinal direction of the vehicle, a rear portion 5 extending in a second direction substantially parallel to the first direction, below the first direction, and a transitional portion 6 extending downward and toward the rear between the front portion 4 and the rear portion 5, and connecting the front portion 4 and the rear portion 5.

The stringer 2 tops a structural element 7 of the vehicle, forming a front cradle, hereinafter called cradle. This cradle 7 generally comprises a platform provided with fasteners intended to support the front suspension of the vehicle.

The cradle 7 is for example formed from a metal sheet at least 3 mm thick, and preferably formed from a steel whose elastic limit is greater than 500 MPa.

The front portion 4 of the stringer 2 and the cradle 7 generally extend in planes parallel to each other, while the rear portion 5 of the stringer 2 extends at a height adjacent to the height of the cradle 7. The cradle 7 is for example rigidly fastened to the rear portion 5 of the stringer 2, for example by welding, riveting or bolting, or using a flexible system filtering vibrations.

The front part 1 further comprises a structural component 9 facing the cradle 7 in front of the cradle 7.

The structural component 9 extends in a substantially longitudinal direction of the vehicle between a front end 9a and a rear end 9b. The rear end 9b of the component 9 faces the cradle 7. The component 9 extends from the rear end 9b substantially parallel to the front portion 4 of the stringer 2, to its front end 9a situated substantially overhanging a front end 4a of the front portion 4 of the stringer 2.

An elongated part 13, also called pipe hanger, vertically connects the front portion 4 of the stringer 2 to the component 9, in particular the front end 4a of the front portion 4 to the front end 9a of the component 9. The pipe hanger 13 is for example made in the form of a beam element.

Furthermore, a connecting device 15 is mounted between the front end 9a of the component 9 and the pipe hanger 13. The connecting device 15 is configured to allow the component 9 to move relative to the pipe hanger 13. This movement is essentially longitudinal.

Preferably, the connecting device 15 comprises guideway-type link provided with a removable arresting member. The word guideway here refers to any guiding of movement, not necessarily rectilinear, like a cam, with or without permanent contact. The removable arresting member is, in light of its assembly, configured to give, or break, under a predetermined breaking force, to within any allowances. The movement of the component 9 relative to the pipe hanger 13 thus can only be done from an applied force (in particular longitudinal, from front to back) greater than or equal to the predetermined breaking force of the removable arresting member. For lesser forces, this movement is prevented.

The front portion 4 of the stringer 2 receives, at its front end 4a, a shock absorbing member, or absorber 17. The component 9 receives, at its front end 9a, an absorber 19. During a frontal impact, the absorbers 17 and 19 are provided to deform, generally along their length, dissipating a predetermined quantity of energy.

The front portion 4 of the stringer 2 bears one side of a middle bumper crosspiece 21 via the absorber 17. The component 9 partly supports a lower bumper crosspiece 23 via the absorber 19.

The front of the vehicle described above further comprises, symmetrically, a second front part 4 of a second stringer 2, a second component 9, a second pipe hanger 13, a second connecting device 15 and second absorbers 17 and 19. The crosspieces 21 and 23 are thus supported by the front portions 4 of the two stringers 2 and by the two components 9, respectively.

The assembly comprising the components 9, the crosspiece 23, optionally the absorbers 19, as well as the cradle 7 is generally called front lower area. The assembly comprising the stringers 2, the crosspiece 21 and the absorbers 17 is generally called front middle area, having noted that a front upper area may exist higher up.

Furthermore, in the descriptions and the claims, the term "front area section" will refer to the half of the front area located on one side of the vehicle. In the present case, the front lower area section is the half of the front lower area located on one side of the vehicle and the components shared by the two halves of the vehicle, i.e., including a component 9, an absorber 19, the cradle 7 and the crosspiece 23.

Figure 2:
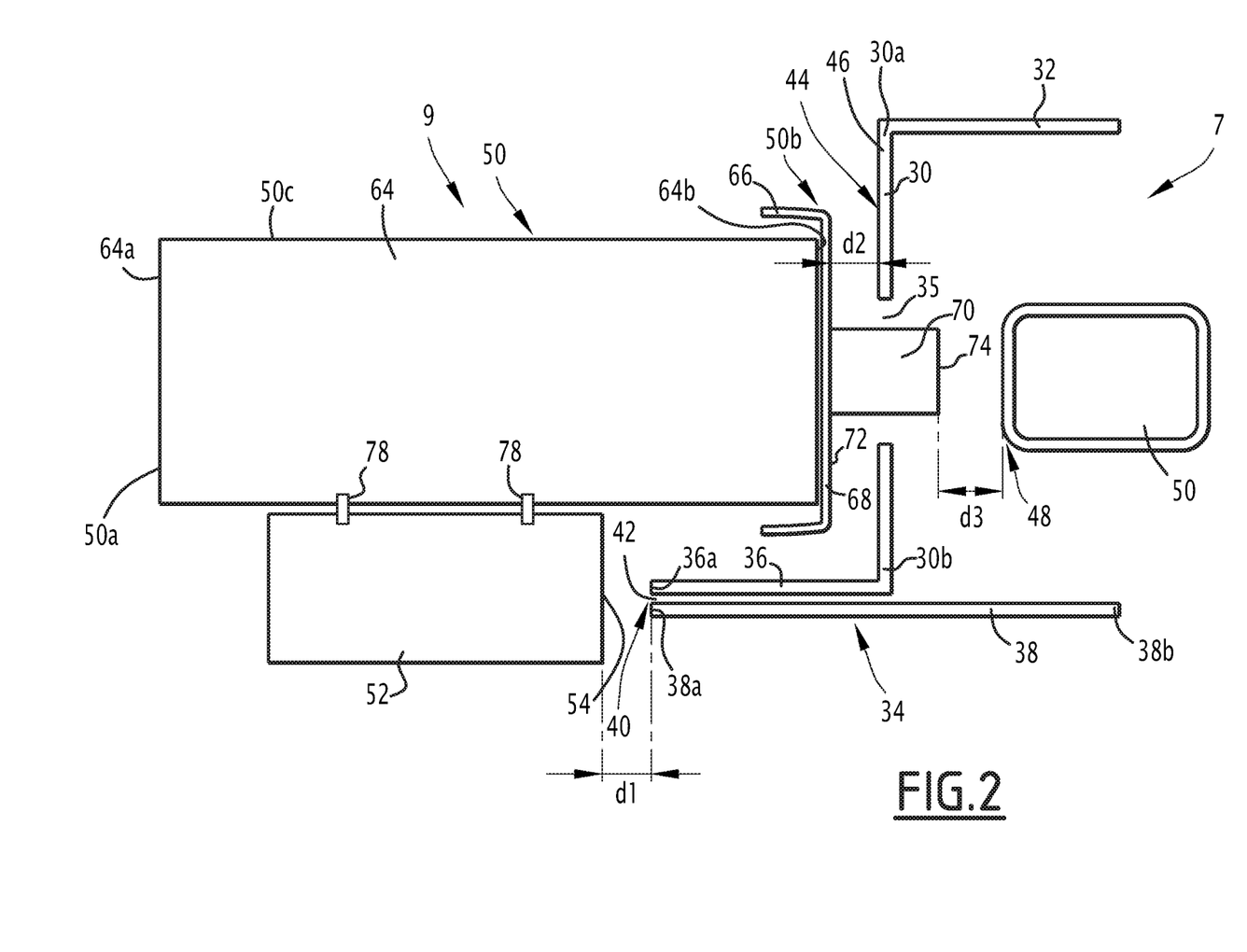
FIG. 2 is a detailed view of the front low area section of FIG. 1.

The component 9, the cradle 7 and their arrangement are illustrated in more detail in FIG. 2.

In FIG. 2, only a front end of the cradle 7 is shown.

This front end includes a transverse wall 30, an upper longitudinal wall 32 and a lower longitudinal wall 34.

The transverse wall 30 extends in along [sic] a substantially transverse plane of the vehicle, between an upper edge 30a and a lower edge 30b.

In the illustrated example, the transverse wall 30 is provided with a through opening 35.

The upper longitudinal wall 32 extends substantially orthogonally to the transverse wall 30, in a substantially horizontal plane, toward the rear from the upper edge 30a.

The lower longitudinal wall 34 is a double wall. It in fact comprises an upper segment 36 and a lower segment 38. The upper segment 36 extends substantially orthogonally to the transverse wall 30, in a substantially horizontal plane, toward the front from the lower edge 30b, up to a front edge 36a of the upper segment. The lower segment 38 extends between a front edge 38a and a rear edge 38b, substantially parallel to the upper segment 36, toward the rear from the front edge 36a of the upper segment 36. The lower segment 38 thus extends substantially orthogonally to the transverse wall 30, in a substantially horizontal plane.

The front edge 36a of the upper segment 36 and the front edge 38a of the lower segment 38 define a first region 40 of the cradle 7.

The first region 40 comprises a first contact surface 42 extending in a substantially transverse plane.

The transverse wall 30 forms a second region 44 of the cradle 7. The transverse wall 30 comprises a second contact surface 46, oriented toward the front of the vehicle, and which extends in a substantially transverse plane.

A third region 48 of the cradle 7 is formed by a member 50, which is for example a member for fastening the cradle 7 to the structure of the vehicle.

The first region 40 of the cradle is a region with reinforced stiffness relative to the second region 44 of the cradle, and preferably also relative to the third region 48 of the cradle 7.

The component 9 comprises an extension 50, also called extension piece, extension or add-on, and a stop element 52.

The extension 50 extends in a longitudinal direction between a front end 50a and a rear end 50b, corresponding to the front 9a and rear 9b ends of the component 9 (FIG. 1). The extension 50 comprises a substantially longitudinal side wall 50c extending between the front end 50a and the rear end 50b. The extension 50 is for example tubular, with a circular or polygonal cross-section.

Thus, the front end 50a of the extension 50 is connected to the front portion 4 of the stringer 2 via the pipe hanger 13 and the connecting device 15.

The rear end 50b of the extension 50 faces the cradle 7, in particular faces the second region 44 of the cradle 7. In the illustrated example, the rear end 50b of the extension 50 also faces the third region 48 of the cradle 7.

In this embodiment, the component 9, in particular the extension 50, is not fastened directly to the cradle 7, but is connected to the cradle 7 via the pipe hanger 13, the connecting device 15 and the stringer 2.

In the idle state, i.e., when no force, or when a force below the predetermined breaking force of the removable arresting member of the connecting device 15 mentioned above, is applied on the extension 50, the component 9 is separated from the cradle 7. The connecting device 15 thus makes it possible to avoid any untimely contact between the component 9 and the cradle, capable of generating vibrations and wear, while allowing the component 9 to move when an impact occurs, which makes it possible to cause part of the forces generated by the impact to pass through the lower area.

The stop element 52 protrudes from the side wall 50c of the extension 50, in a substantially transverse direction, downward. The stop element 52 is secured to the extension 50. The stop element 52 is intended to transmit part of the forces created during an impact on the extension 50 to the first region 40 of the cradle. The stop element 52 is made from a steel, the elastic limit of which is preferably greater than or equal to 500 MPa, and the tensile strength of which is preferably greater than or equal to 550 MPa.

The stop element 52 is configured to abut against the cradle 7, in particular against the first region 40 of the cradle 7, when the extension 50 is subject to an impact creating forces in the longitudinal direction from its front end 50a toward its rear end 50b, so as to transmit a first part of the forces created by this impact to the first region 40 of the cradle 7.

"Impact creating forces in the longitudinal direction" refers to an impact creating forces at least in the longitudinal direction, with the understanding that forces in another direction, in particular transverse, can be created by the impact. Of course, the impact is not necessarily produced on the extension 50 itself, but can be transmitted by other components of the structure of the motor vehicle, in particular by the lower bumper crosspiece 23, when an impact occurs.

The stop element 52 comprises a first contact surface 54 that faces the first region 40 of the cradle 7, in particular the first contact surface 42 of the first region 40 of the cradle 7. Preferably, the first contact surface 54 of the stop element 52 extends in a first substantially transverse plane, in particular substantially parallel to the first contact surface 42 of the first region 40 of the cradle 7.

The stop element 52 is configured such that, when the extension 50 is subject to an impact creating forces in the longitudinal direction from its front end 50a toward its rear end 50b, the first contact surface 54 of the stop element 52 comes into contact with the first region 40 of the cradle 7, so as to transmit a first part of the forces created by this impact to the first region 40 of the cradle 7.

In the idle state, i.e., when no force, or when a force below the predetermined breaking force of the removable arresting member of the connecting device 15 mentioned above, is applied on the extension 50, the stop element 52 is not in contact with the first region 40 of the cradle 7. Thus, the first contact surfaces 54 and 42 of the stop element 52 and the first region 40 of the cradle are not in contact, but are at a distance denoted d1 from one another, the distance d1 being predetermined, as described below. The stop element 52 is thus positioned on the side wall of the extension 50 along its longitudinal direction such that the distance between the first contact surfaces 54 and 42 is located at the predetermined distance d1 from one another.

When the extension 50 is subject to a longitudinal force from front to back, this force being greater than or equal to the predetermined breaking force of the removable arresting member of the connecting device 15, the extension 50 is configured to move in the longitudinal direction, the stop element 52 then abutting against the first region 40 of the cradle 7 and transmitting a first part of the forces to which the extension 50 is subjected to the first region 40 of the cradle 7. In particular, the first contact surface 54 of the stop element 52 comes into contact against the first contact surface 42 of the first region of the cradle, such that the stop element 52 transmits the first part of the forces to which the extension is subjected to the first region 40 of the cradle.

The extension 50 comprises an elongate part 64 and an intermediate part 66, hereinafter referred to as cup.

The elongate part 64 extends in a substantially longitudinal direction between a front end 64a, forming the front end 50a of the extension and corresponding to the front end 9a of the component 9, and a rear end 64b. The elongate part 64 comprises the side wall 50c of the extension.

The elongate part 64 is made from a steel, the elastic limit of which is for example at least 670 MPa, and the tensile strength of which is at least 780 MPa. The elongate part 64 is preferably of the type "with programmed deformation", i.e., the deformation law of which under the effect of a compression force is determined. Such a part is in particular described in document WO2005/003587.

The cup 66 is secured to the rear end 64b of the elongate part 64. The cup 66 is inserted between the elongate part 64 and the cradle 7, in particular between the elongate part 64 and the second and third regions 44, 48 of the cradle 7. The cup 66 is for example made from steel, the elastic limit of which is preferably greater than 400 MPa. The thickness of the cup 66 is for example comprised between 1.5 mm and 3.0 mm.

The cup 66 comprises a substantially transverse wall 68, and a stud 70 protruding in a substantially longitudinal direction from the wall 68 toward the rear, i.e., toward the cradle 7. Preferably, as illustrated in FIG. 2, the stud 70 is received in the opening 35 of the transverse wall 30 of the cradle 7.

The wall 68 comprises a rear surface 72, which faces the second region 44 of the cradle 7, in particular the second contact surface 46. The rear surface 72, which forms a second contact surface, extends in a second substantially transverse plane, and substantially parallel to the second contact surface 46 of the cradle 7. The second plane is separate from the first plane in which the first contact surface 54 extends. Preferably, the second plane is arranged behind the first plane in the longitudinal direction.

The component 9 is configured such that, when the extension 50 is subject to an impact creating forces in the longitudinal direction from its front end 50a toward its rear end 50b, the second contact surface 72 comes into contact with the second region 44 of the cradle 7, so as to transmit a second part of the forces created by this impact to the second region 44 of the cradle 7.

In the idle state, i.e., when no force, or when a force below the predetermined breaking force of the removable arresting member of the connecting device 15, is applied on the extension 50, the second contact surface 72 is not in contact with the second region 44 of the cradle 7. Thus, the second contact surfaces 72 and 46 of the extension 50 and the second region 44 of the cradle 7 are not in contact, but are at a distance denoted d2 from one another, the distance d2 being predetermined, as described below.

When the extension 50 is subject to a longitudinal force from front to back, this force being greater than or equal to the predetermined breaking force of the removable arresting member of the connecting device 15, the extension 50 is configured to move in the longitudinal direction, the second contact surface 72 of the extension 50 coming into contact against the second contact surface 46 of the second region 44 of the cradle 7, such that the extension transmits a second part of the forces to which it is subjected to the second region 44 of the cradle 7.

The stud 70 comprises a rear surface 74, which faces the third contact region 48 of the cradle 7. The rear surface 74, which forms a third contact surface, extends in a third substantially transverse plane.

The third plane is separate from the second plane in which the second contact surface 72 extends, and also separate from the first plane in which the first contact surface 54 extends. The third plane is arranged behind the second plane in the longitudinal direction.

The component 9 is configured such that, when the extension 50 is subject to an impact creating forces in the longitudinal direction from its front end 50a toward its rear end 50b, the third contact surface 74 of comes into contact with the third region 48 of the cradle 7, so as to transmit a third part of the forces created by this impact to the second region 44 of the cradle 7.

In the idle state, i.e., when no force, or when a force below the predetermined breaking force of the removable arresting member of the connecting device 15, is applied on the extension 50, the third contact surface 74 is not in contact with the third region 48 of the cradle 7, but is at a distance denoted d3 from the third region of the cradle.

When the extension 50 is subject to a longitudinal force from front to back, this force being greater than or equal to the predetermined breaking force of the removable arresting member of the connecting device 15, the extension 50 is configured to move in the longitudinal direction, the third contact surface 74 of the extension 50 coming into contact with the third region 48 of the cradle 7, such that the extension transmits a third part of the forces to which it is subjected to the third region 48 of the cradle 7.

Thus, in this embodiment, when the extension 50 is subject to an impact creating longitudinal forces from front to back, these forces being greater than or equal to the predetermined breaking force of the removable arresting member of the connecting device 15, the extension 50 is configured to move in the longitudinal direction. The stop element 52 then abuts against the first region 40 of the cradle 7 and transmits a first part of the forces to which the extension 50 is subjected to the first region 40 of the cradle 7. Furthermore, the second contact surface 72 comes into contact with the second region 44 of the cradle 7 and transmits a second part of the forces created by this impact to the second region 44 of the cradle. Lastly, the third contact surface 74 comes into contact with the third region 48 of the cradle 7 and transmits a third part of the forces created by the impact to the third region 48 of the cradle.

Therefore, the forces to which the extension 50 is subjected are transmitted to the cradle 7 while being distributed in three separate regions of the cradle. Thus, the presence of the stop element 52 on the extension 50 makes it possible to reduce the forces transmitted to the second and third regions of the cradle 7, and thus to have the second and third regions 44 and 48 undergo, in particular during a low-speed impact, forces lower than those that would be transmitted without the stop element. The stop element 54 therefore makes it possible to limit the risks of damaging the cradle 7, in particular of plastic deformation of the cradle, during a low-speed impact.

The distribution of the forces on the first 40, second 44 and third 48 regions of the cradle 7 depend on the relative distances d1, d2 and d3.

The distances d1, d2 and d3 are chosen so as to distribute the forces transmitted to the first, second and third regions of the cradle 7 such that, when the extension 50 is subject to an impact corresponding to a low-speed impact:

the first part of the forces, transmitted to the first region 40, is below a ruin threshold of the stop and/or the first region 40, the second part of the forces, transmitted to the second region 44, is below a threshold beyond which a flexion deformation exceeding a predetermined deformation threshold of the transverse wall 30 would be observed, the third part of the forces, transmitted to the third region 48, is below a holding threshold of the third region 48.

The predetermined deformation threshold is for example defined as a maximum warp not to be exceeded, for example a maximum warp of 1.0 mm. In this case, the distances d1, d2 and d3 are chosen such that, when the extension 50 is subject to an impact corresponding to a low-speed impact, the second part of the forces, transmitted to the second region 44, is below a threshold beyond which a maximum warp of the transverse wall 30 of more than 1.0 mm would be observed.

According to another example, the predetermined deformation threshold is a plastic deformation limit of the transverse wall 30, for example set at 2%. In this case, the distances d1, d2 and d3 are chosen such that, when the extension 50 is subject to an impact corresponding to a low-speed impact, the second part of the forces, transmitted to the second region 44, is below a threshold beyond which a flexion deformation in the plastic domain of more than 2% of the transverse wall 30 would be observed.

These two criteria can be combined. Thus, according to one example, the distances d1, d2 and d3 are chosen such that, when the extension 50 is subject to an impact corresponding to a low-speed impact, the second part of the forces, transmitted to the second region 44, or below a first threshold beyond which a maximum warp of the transverse wall 30 of more than 1.0 mm would be observed and is below a second threshold beyond which a flexion deformation in the plastic domain of more than 2% of the transverse wall 30 would be observed.

For example, the distances d1 and d2 are chosen to be substantially equal, which means that when an impact occurs creating forces on the extension 50 in its longitudinal direction from its front end 50a toward its rear end 50b, the contact between the first surface 44 of the stop element 52 and the first region 40 of the cradle 7 and the contact between the second contact surface 72 and the second region 44 of the cradle are substantially simultaneous. "Substantially equal" means that the difference between the distance d1 and the distance d2 is less than or equal to 1.0 mm.

Preferably, the distance d1 is less than or equal to the distance d2.

Thus, when an impact occurs creating forces on the extension 50 in its longitudinal direction from its front end 50a toward its rear end 50b, the contact between the first surface 44 of the stop element 52 and the first region 40 of the cradle 7 is done before the contact between the second contact surface 72 and the second region 44 of the cradle, which makes it possible to decrease the risk of plastic deformation of the cradle 7, in particular of the second region 44 of the cradle 7.

Furthermore, the distance d3 is for example chosen to be substantially equal to the distances d1 and d2, which means that when an impact occurs creating forces on the extension 50 in its longitudinal direction from its front end 50a toward its rear end 50b, the contact between the first surface 44 of the stop element 52 and the first region 40 of the cradle 7, the contact between the second contact surface 72 and the second region 44 of the cradle 7 and the contact between the third contact surface 74 and the third region 48 of the cradle 7 are substantially simultaneous. In particular, the difference between the distance d2 and the distance d1 in absolute value is less than or equal to 1.0 mm, and the difference between the distance d2 and the distance d3 is, in absolute value, less than or equal to 1.0 mm.

In general, it is observed that, during a low-speed impact, the first part of the forces, transmitted to the first region 40, is even greater when the distance d1 between the first contact surfaces 54 and 42 is small, with constant distances d2 and d3. On the contrary, when the distance d1 between the first contact surfaces 54 and 42 increases, with constant distances d2 and d3, the first part of the forces, the first part of the forces, transmitted to the first region 40, decreases, which thereby causes an increase of the forces transmitted to the second and third regions 44 and 48, and an increase in the risk of damaging the cradle.

Figure 3:
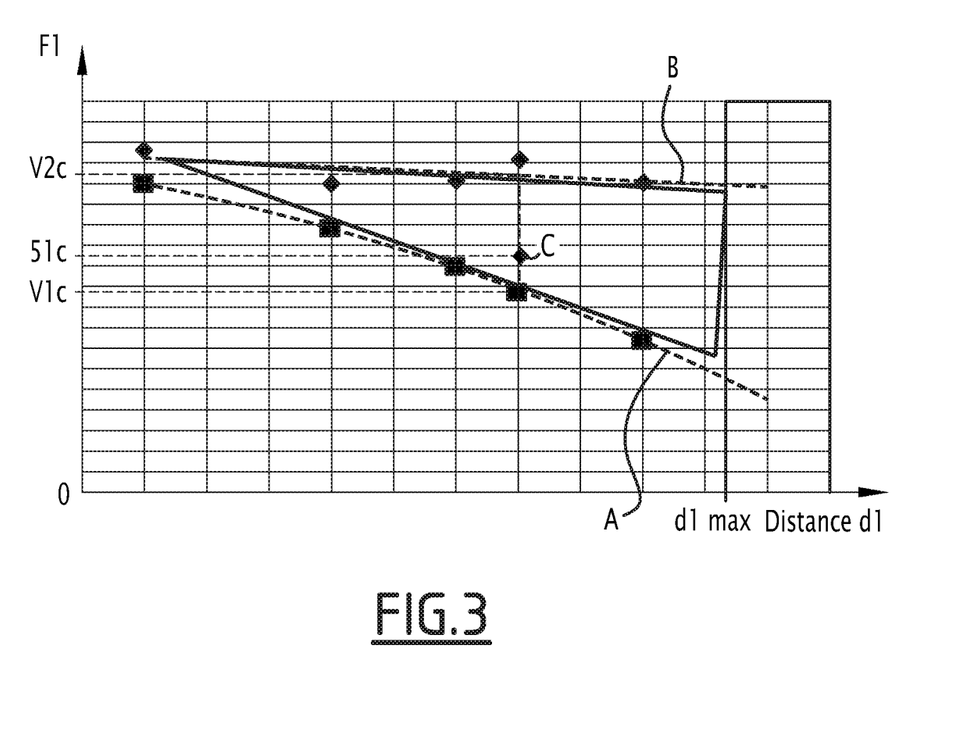
FIG. 3 is a graph illustrating forces transmitted during impacts of various intensities.

FIG. 3 thus shows a first curve A illustrating the contact forces F1 between the first contact surface 54 of the stop element 52 and the first region 40 of the cradle 7, corresponding to the first part of the forces mentioned above, during a low-speed impact. This curve is interrupted for a distance $d1_{max}$ corresponding to the distance d1 for which the first part of the forces transmitted to the first region 40 is insufficient, causing an excessive transmission of forces to the second and/or third region(s) of the cradle 7, and damage of the cradle 7.

During a high-speed impact, the first part of the forces, transmitted to the first region 40, is practically independent from the distance d1, as illustrated by curve B of FIG. 3.

Preferably, the stop element 52 is configured such that when the extension 50 is subject to an impact creating forces in the longitudinal direction from the front end 50a toward the rear end 50b, the first part of the forces transmitted to the first region 40 of the cradle 7 by the first contact surface 54 remains below a first predetermined force threshold, irrespective of the forces created by the impact to which the extension 50 is subjected.

Preferably, as long as the first part of the forces remains below this first predetermined force threshold, this first part of the forces corresponds to a first fraction of the forces created by the impact to which the extension 50 is subjected. However, once the first part of the forces becomes equal to this first predetermined force threshold, the first part of the forces corresponds to a second fraction of the forces created by the impact to which the extension 50 is subjected, smaller than the first fraction.

Thus, the stop element 52 incorporates a fusibility function in order to transmit a smaller fraction of the forces to the first region of the cradle 7, or more generally to any region of the cradle, when the first forces that would be transmitted without such a fusibility function would be above the first predetermined force threshold.

This first predetermined force threshold is preferably comprised, for set distances d1, d2 and d3, between a first value V1 of the first part of the forces and a second value V2 of the first part of the forces.

The first value V1 of the first part of the forces corresponds to the forces transmitted by the extension 50 to the stop element 52, then to the first region 40 during a low-speed impact.

The second value V2 of the first part of the forces corresponds to the forces transmitted by the extension 50 to the stop element 52, and intended for the first region 40 during a high-speed impact.

In other words, the stop element 52 is configured to transmit the first fraction of the forces to the first region 40 for impacts creating forces at least equal to a second force threshold, which is for example equal to the forces created during a low-speed impact.

Conversely, the stop element 52 transmits a smaller fraction of the forces to the first region of the cradle 7, or more generally to any region of the cradle, when the forces generated by the impact are greater than or equal to those generated by a high-speed impact. This makes it possible to limit the disruptions of the impact kinematics and the behavior of the front low area during a high-speed impact by the stop element 52.

FIG. 3 thus shows, as an example, a point C indicating a first predetermined force threshold $S1c$ set for a given distance $d1c$. One can see that the first force threshold $S1c$ is greater than the forces V1c transmitted by the stop element 52 to the first region 40 during a low-speed impact, but lower than the forces V2c that would be transmitted by the stop element 52 to the first region 40 during a high-speed impact. This makes it possible to ensure that the stop element 52 transmits the first fraction of the forces to the first region 40 at least as long as the forces received by the extension 50 are equal to those received during a low-speed impact, but at most as long as the forces received by the extension 50 are equal to those received during a high-speed impact.

To that end, the stop element 52 is configured to deform or move away from the first region 40, and more generally the cradle 7, when the forces transmitted to the stop element 52 that would be transmitted to the first region 40 are above the first predetermined force threshold. In general, the stop element 52 is configured such that when the forces transmitted to the stop element 52 become equal to the first predetermined force threshold, the first contact surface 54 moves at least partially away from the first region 40 so as to limit the forces transmitted to the first region 40.

For example, the stop element 52 being fastened to the extension 50, in particular to the elongate part 64, by frangible fastening means 78, for example screws, the frangible fastening means are configured to break when the first part of the forces transmitted to the first region 40 by the stop element 52 becomes equal to the first predetermined force threshold. Thus, the first part of the forces transmitted to the first region 40 by the stop element 52 still remains below the first predetermined force threshold.

Figure 4:
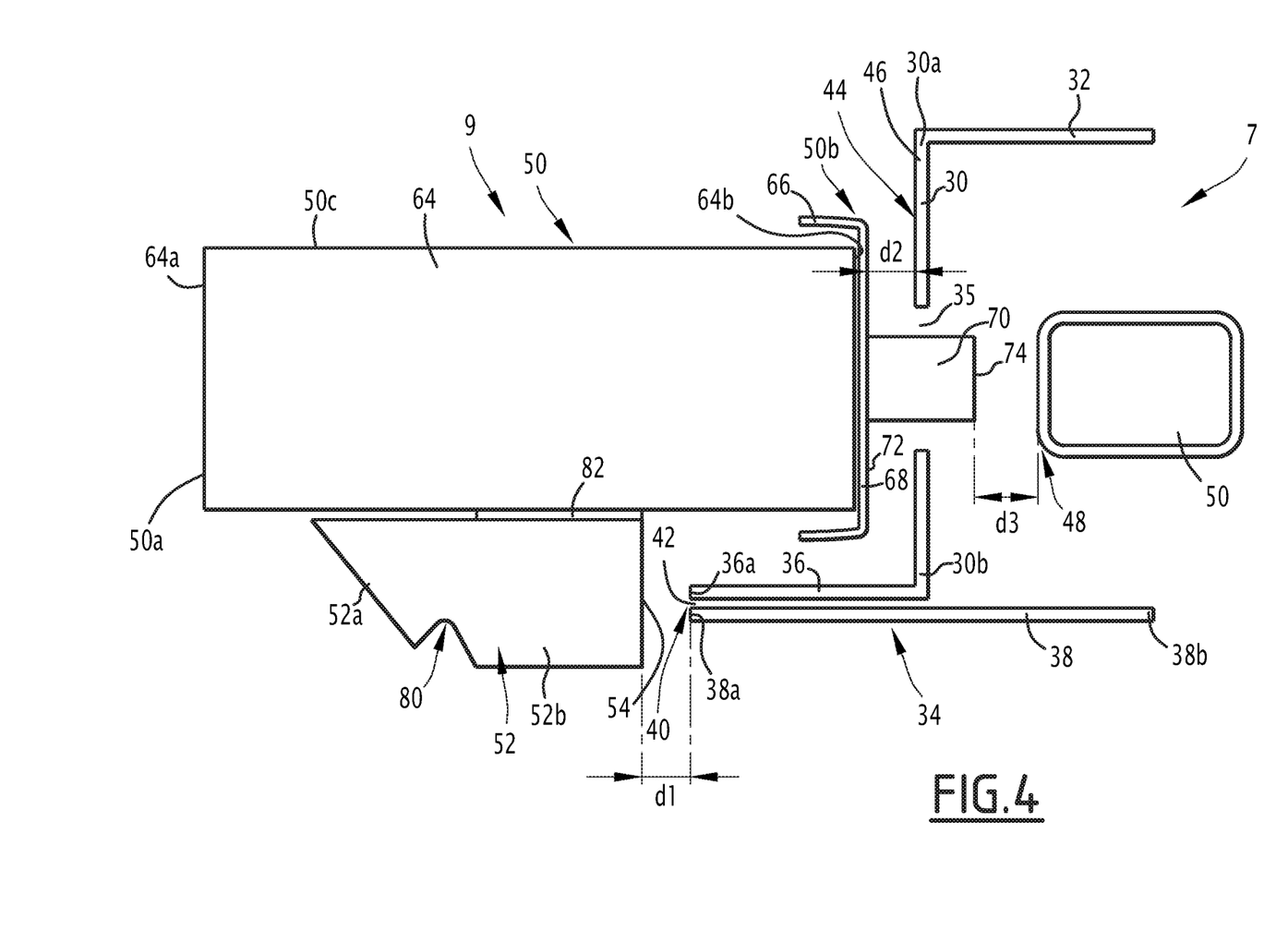
FIG. 4 is a detailed view of the front low area section of FIG. 1, according to one alternative.

Alternatively or additionally, as illustrated in FIG. 4, the component 9 includes a bending initiation zone 80, which is made on the stop element 52. This bending initiation zone is for example a thinner zone than on the rest of the stop element, facilitating the initiation of bending. The component 9 is configured to bend at this bending initiation zone 80, such that the contact surface between the stop element 52 and the first region 40 decreases when the first part of the forces becomes equal to the first predetermined force threshold.

In the example illustrated in FIG. 4, the stop element 52 is fastened on the extension 50 by welding. The stop element 52 comprises a front portion 52a and a rear portion 52b, the rear portion 52b comprising the first contact surface 54. The bending initiation zone 80 is located at the junction between the front portion 52a and the rear portion 52b. Preferably, only the rear portion 52 is welded to the extension 50, for example along a weld seam 82, the front portion 52a simply bearing against the extension 50 when the stop element 52 comes into contact with the first region 40. Alternatively, the stop element 52 is made in one piece with the elongate part 64, the weld seam 82 then being replaced by a continuous connecting zone between the elongate part 64 and the stop element 52.

When the first part of the forces transmitted by the stop element 52 to the first region 40 of the cradle 7 reaches the first predetermined force threshold, the component 9, including the extension 50 and the stop element 52, is configured to bend at the bending initiation zone 80. Thus, the contact surface between the stop element 52 and the cradle 7 decreases, such that the fraction of the forces transmitted by the stop element 52 to the cradle 7 is lessened.

Figure 5:
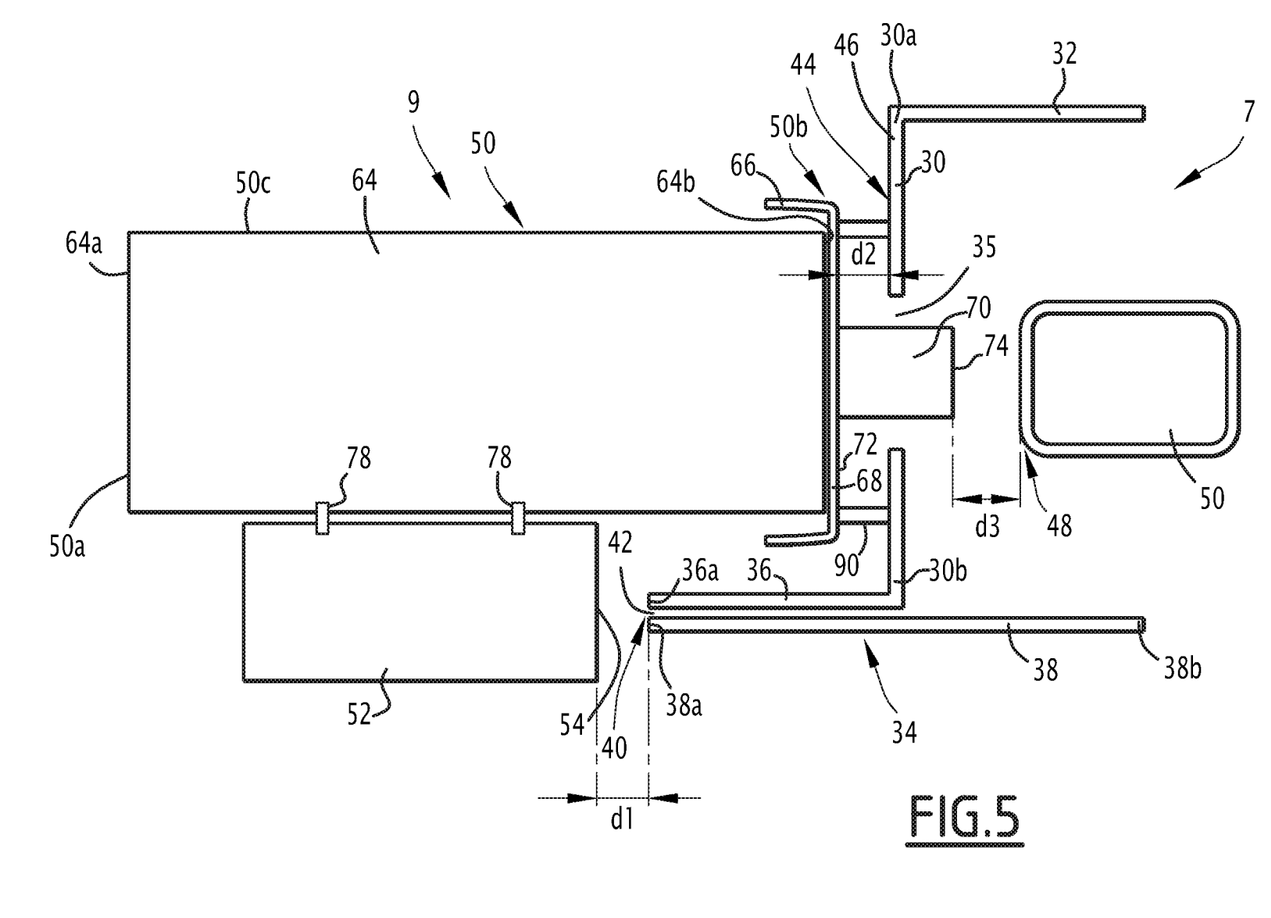
FIG. 5 is a detailed view of a front low area section, according to another alternative.

According to another alternative, illustrated in FIG. 5, the component 9 is fastened to the cradle 7 using a resilient articulation 90 inserted between the rear end 50b of the extension 50 and the cradle 7, in particular between the rear end 50b of the extension 50 and the second region of the cradle 7, more specifically between the cup 66 and the second region of the cradle 7.

The resilient articulation 90 is for example generally annular. The resilient articulation 90 makes it possible, like the connecting device 15, to avoid any untimely contact between the component 9 and the cradle 7, capable of generating vibrations and wear, while allowing the component 9 to move when an impact occurs, which makes it possible to cause part of the forces generated by the impact to pass through the lower area.

The resilient articulation 90 for example comprises a recess allowing contact between the second and third contact surfaces 72 and 74 of the component with the second and third regions 44 and 48 of the cradle 7 respectively when the extension 50 is subjected to an impact creating forces in the longitudinal direction, from its front end 50a toward its rear end 50b, exceeding a predetermined force threshold. In this alternative, the connecting device 15 can be omitted, the pipe hangar 13 directly connecting the front portion 4 of the stringer 2 to the component 9.

It must be understood that the example embodiments described above are not limiting.

In particular, the cup 66 could be absent from the extension 50, the rear end 50b of the extension 50 then being formed by the rear end 64b of the elongate part. According to another alternative, the cup 66 does not comprise a stud 70 and the extension 50 does not comprise a third contact surface intended to come into contact with a third region of the cradle 7.

Furthermore, in the alternative illustrated in FIG. 5, the stop element 52 is fastened to the extension 50 by frangible fastening means 7, but could be integral with the elongate part 64, or welded on the elongate part 64, as illustrated in FIG. 4, and include a bending initiation zone 80.

What is claimed is:

1. A front low area section of a motor vehicle comprising:
a structural component; and
a structural element of the cradle type, the structural element comprising a first region,
the structural component being connected to the structural element, the structural component comprising:
an extension extending in a longitudinal direction between a front end and a rear end, the rear end facing the structural element; and
a stop element protruding in a transverse direction from a longitudinal wall of the extension, the stop element comprising a first contact surface facing a first region of the structural element;
the stop element configured such that when the extension is subject to an impact creating forces in the longitudinal direction from the front end toward the rear end, the first contact surface of the stop element comes into contact with the first region of the structural element and transmits a first part of the forces created by the impact to the first region of the structural element.

2. The front low area section as recited in claim 1, wherein the rear end comprises at least one second contact surface facing at least one second region of the structural element, the component being configured such that when the extension is subject to the impact creating the forces in the longitudinal direction from the front end toward the rear end, the second contact surface comes into contact with the second region of the structural element and transmits a second part of the forces created by the impact to the second region of the structural element.

3. The front low area section as recited in claim 2, wherein a first distance between the first contact surface and the first region is substantially equal to a second distance between the second contact surface and the second region, the difference between the first distance and the second distance being, in absolute value, less than or equal to 1.0 mm.

4. The front low area section as recited in claim 2, wherein the first and second contact surfaces extend in a first and second plane, respectively, the first and second planes being separate and wherein the rear end comprises the one second contact surface and a third contact surface, the third contact surface extending in a third plane separate from the first and second planes, the extension being configured such that when the extension is subject to the impact creating the forces in the longitudinal direction from the front end toward the rear end, the second contact surface comes into contact with the second region of the structural element and transmits the second part of the forces created by the impact to the second region of the structural element, and the third contact surface comes into contact with a third region of the structural element and transmits a third part of the forces created by the impact to the third region of the structural element.

5. The front low area section as recited in claim 4, wherein a first distance between the first contact surface and the first region is substantially equal to a second distance between the second contact surface and the second region, the difference between the first distance and the second distance being, in absolute value, less than or equal to 1.0 mm, and the second distance between the second contact surface and the second region is substantially equal to a third distance between the third contact surface and the third region, the difference between the second distance and the third distance being, in absolute value, less than or equal to 1.0 mm.

6. The front low area section as recited in claim 4, wherein the extension comprises an elongate part extending in the longitudinal direction and an intermediate part secured to one end of the elongate part, the intermediate part comprising the second contact surface, and the intermediate part further comprises the third contact surface.

7. The front low area section as recited in claim 2, wherein the first and second contact surfaces extend in a first and second plane, respectively, the first and second planes being separate.

8. The front low area section as recited in claim 2, wherein the extension comprises an elongate part extending in the longitudinal direction and an intermediate part secured to one end of the elongate part, the intermediate part comprising the second contact surface.

9. A motor vehicle structure comprising the front low area section as recited in claim 1.

10. The front low area section as recited in claim 1, wherein the stop element is configured such that the first part of the forces transmitted by the first contact surface of the stop element to the first region of the structural element remains below a first predetermined force threshold, independently of the forces created by the impact.

11. The front low area section as recited in claim 10, wherein the first predetermined force threshold is greater than or equal to a second force threshold corresponding to the forces transmitted by the first contact surface to the first region of the structural element during an impact at a first predetermined speed.

12. The front low area section as recited in claim 11, wherein the first predetermined force threshold is less than a third force threshold corresponding to the forces that would be transmitted by the first contact surface to the first region of the structural element during a high-speed impact.

13. The front low area section as recited in claim 11, wherein the first predetermined force threshold is less than a third force threshold corresponding to the forces that would be transmitted by the first contact surface to the first region of the structural element during an impact at a second predetermined speed.

14. The front low area section as recited in claim 10, including a bending initiation zone, the component being configured to bend at the bending initiation zone when the first part of the forces becomes equal to the first predetermined force threshold, such that the first part of the forces transmitted by the first contact surface of the stop element to the first region of the structural element remains below the first predetermined force threshold.

15. The front low area section as recited in claim 10, wherein the first predetermined force threshold is greater than or equal to a second force threshold corresponding to the forces transmitted by the first contact surface to the first region of the structural element during a low-speed impact.

16. The front low area section as recited in claim 1, wherein the stop element is fastened to the longitudinal wall of the extension by a frangible fastener.

17. The front low area section as recited in claim 16, wherein the stop element is configured such that the first part of the forces transmitted by the first contact surface of the stop element to the first region of the structural element remains below a first predetermined force threshold, independently of the forces created by the impact, and the frangible fastener is configured to break when the first part of the forces becomes equal to the first predetermined force threshold.

18. The front low area section as recited in claim 1, wherein the stop element is made from a steel having a tensile strength greater than or equal to 570 MPa.

* * * * *